(No Model.)  2 Sheets—Sheet 1.

J. MILLS & A. S. SMITH.
METAL SHAPING MACHINE.

No. 490,670.  Patented Jan. 31, 1893.

Attest:
Harry Byrne
Arthur Moore

Inventors.
James Mills.
Albert S. Smith.
by James N. Layman.
Atty.

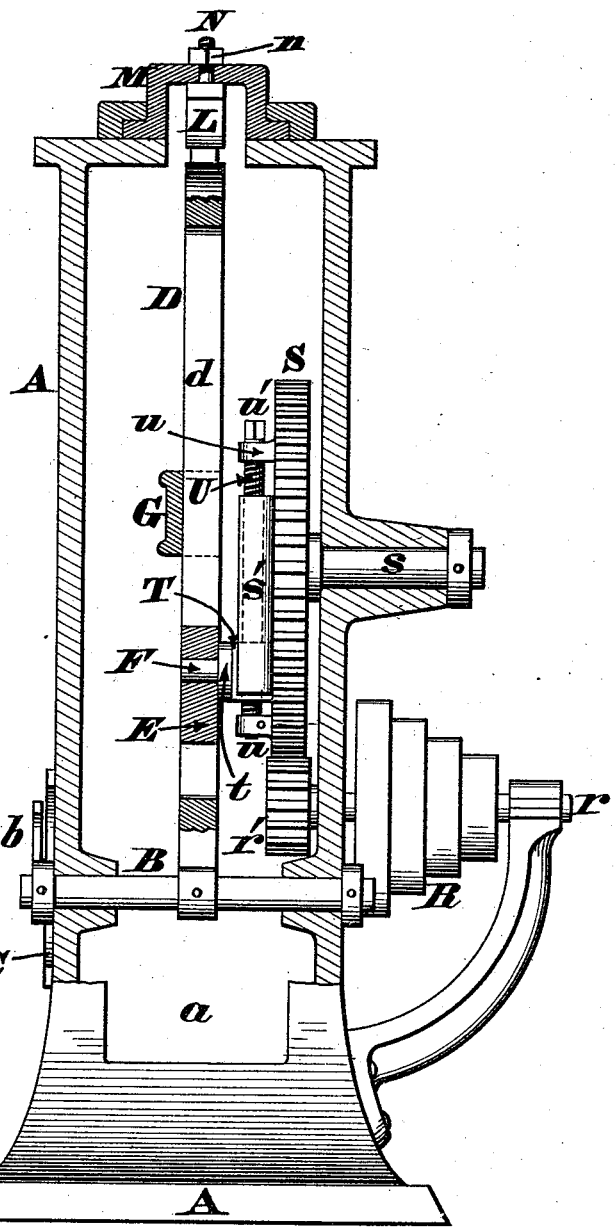

UNITED STATES PATENT OFFICE.

JAMES MILLS AND ALBERT S. SMITH, OF CINCINNATI, OHIO.

METAL-SHAPING MACHINE.

SPECIFICATION forming part of Letters Patent No. 490,670, dated January 31, 1893.

Application filed February 16, 1892. Serial No. 421,699. (No model.)

*To all whom it may concern:*

Be it known that we, JAMES MILLS and ALBERT S. SMITH, citizens of the United States, residing at Cincinnati, in the county of Hamilton and State of Ohio, have invented certain new and useful Improvements in Metal-Shaping Machines; and we do hereby declare the following to be a full, clear, and exact description of the invention, reference being had to the annexed drawings, which form part of this specification.

This invention relates to those workshop appliances commonly known as metal-shaping machines, and the first part of our improvements consists in applying a pointer or index to a rock-shaft or pivot of a vibrating lever whose free end reciprocates the "ram," which pointer, in connection with a graduated scale, indicates the exact stroke of said ram in inches and fractions of the same, thereby enabling the machine to be adjusted with the utmost accuracy, as hereinafter more fully described.

The second part of our improvements consists in slotting this lever longitudinally and fitting therein a block carried by an adjustable wrist-pin, the lever being provided with a clamping-band and set screw, the tightening of which latter causes said lever to compress said block so closely as to prevent "lost motion," as hereinafter more fully described.

Figure 1:
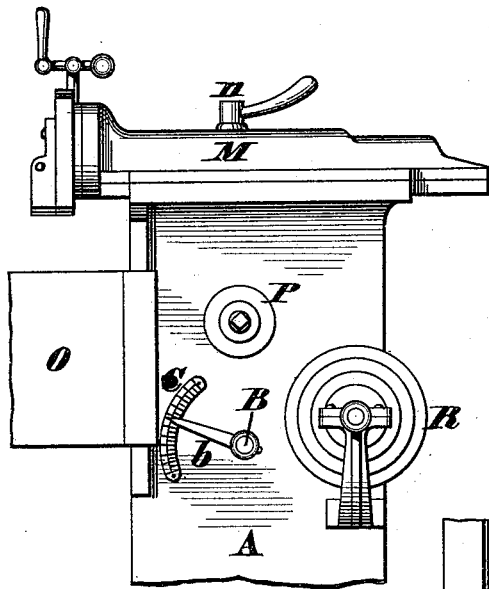
Figure 2:
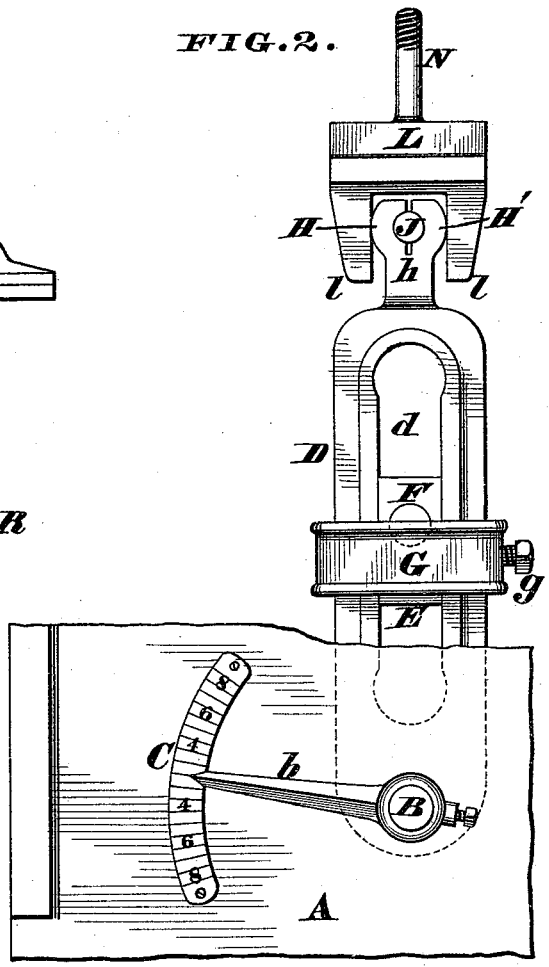
Figure 3:
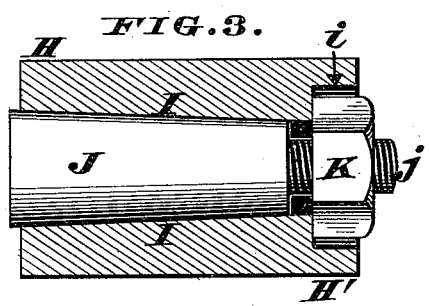
Figure 4:
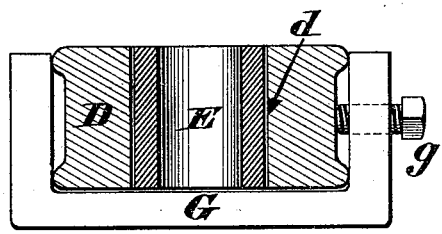

In the annexed drawings. Figure 1 is a side elevation of the upper portion of a metal-shaping machine embodying our improvements. Fig. 2 is an enlarged side elevation of the vibrating lever and its accessories, a sufficient portion of the main frame of the machine being included in this illustration to show the rock-shaft, index and graduated scale. Fig. 3 is an enlarged transverse section through the joint that couples the vibrating lever to the ram. Fig. 4 is a similar section through the lever, block and clamp. Fig. 5 is a vertical section of one form of our shaper taken in the plane of the spur-wheel shaft, the adjustable wrist-pin of said wheel being set to impart a full stroke to the vibrating lever. Fig. 6 is an enlarged section of said wheel taken transversely of its screw and guides.

A represents part of the main frame of a metal-shaping machine of any approved construction, and B is a rock shaft or other pivot journaled transversely in said frame and provided at one end with a pointer or index $b$, adapted to operate in connection with a fixed scale C. This scale may be cast with the main frame, but it usually consists of a plate attached thereto, and graduated to indicate inches and fractions of the same. Rock shaft B is either cast with or rigidly secured to the lower part of a vibrating lever D, having a longitudinal slot $d$, traversed by a block E, operated by a wrist-pin or crank F, which latter must be so arranged as to impart a greater or less swing to said lever, according to the desired stroke of the ram. We prefer, however, that this device F, shall be the equivalent of the wrist-pin H, seen in Letters Patent No. 421,297, issued to Smith and Mills, February. 11. 1890, and we also prefer to adjust said device F, by the mechanism described in said patent, although the invention is not limited to any special construction.

Adapted to grasp lever D, in the manner seen in Fig. 4, is a clamping band G, open on one side and provided with a tightening screw $g$, the extreme upper end of this lever being provided with a pair of convex bearings H, H', separated by a slot $h$. Furthermore, this end of the lever has a tapering bore I, seen in Fig. 3, to admit a conical bolt or other expander J, the smaller end thereof having a screw-threaded shank $j$ for the engagement of a nut K. Bore I is counterbored at one end, as at $i$, to admit this nut. The convex bearings H, H', play snugly within the fork $l$ of a slide L, adapted to reciprocate in the upper part of the main frame and carrying the ram M.

N is a screw-threaded stud projecting vertically from this slide and having a nut $n$ engaged therewith. These devices N $n$, couple the ram to the slide and yet permit their ready detachment, when occasion requires.

O is a portion of the work-supporting table.

P is part of the mechanism for varying the throw of the operating wrist-pin, as in the patent previously alluded to.

R are customary stepped-pulleys attached to the driving shaft of the machine.

From the above description it is evident that by properly adjusting the wrist-pin F, in the manner described in Smith and Mills' patent, a greater or less vibration will be imparted to lever D, and, as a matter of course, the stroke of ram M will be in exact proportion to the swing of said lever. It is also evident that at every vibration of lever D, the pointer $b$ will travel up and down in front of the scale C, and thus indicate the exact stroke of the ram, and if it is moving a greater distance than the work requires, the wrist pin can be adjusted until the play of said ram is properly restricted. But if the pointer shows that the ram is not traveling far enough at each stroke, the wrist pin is then so adjusted as to impart a greater swing to the lever D. It will thus be seen that the provision of these indicating devices $b$. C. shows if the machine is properly regulated for each and every piece of work to be shaped on it, and, as a natural result, considerable time is saved by using said attachments. The constant reciprocating of block E within the slot $d$ produces more or less wear and occasions "lost motion," which defect can not be remedied by using gibs, wedges &c., but by simply applying the band G to the lever D, and then tightening the screw $g$, the slot of said lever will be contracted until said block has merely sufficient room to travel in. This application of the band also stiffens the lever, and prevents its sides springing outwardly when the block travels along the slot, and, on this account, there is no "chattering" in the machine. In case the lever should be unusually long, it can be provided with a number of these clamping bands located at such intervals as will be the most effective for contracting the slot.

If there should be any wear of the bearings H. H'. or fork $l$, the nut K can be turned to advance the expander J along the bore I between said bearings, and as the slot $h$ renders this portion of the lever somewhat yielding, the shifting of said expander widens said lever. Consequently, said bearings are slightly separated from each other, and caused to fit snugly within the fork. But if there should be too much friction between the lever and fork, the expander is retracted to allow the bearings to approach each other as closely as may be necessary to afford the requisite clearance.

As previously stated, the exact method of shifting the wrist-pin is immaterial, but a very simple arrangement of adjusting devices is seen in Fig. 5. Here, the inner end of shaft $r$, that carries the stepped pulleys R, has a pinion $r'$ secured to it, which pinion gears with a spur-wheel S. keyed to a shaft $s$. the wheel S. being provided with a pair of parallel radial-guides $s'$, $s'$, traversed by a nut T, from which latter projects the wrist-pin F. $t$ is an annular-washer or collar that may be interposed between this nut, T, and the block E, carried by the pin F. Furthermore, this wheel S, has a pair of bearings $u$. $u$. for a screw U, engaged with the nut T, one end of said screw being furnished with a square $u'$, to which a socket wrench or key is applied whenever said nut is to be shifted either toward or away from the center of wheel S, for the purpose of varying the stroke of lever D.

$a$ is an opening in the back of the main frame to afford convenient access to the operative parts of the shaper. It is to be understood, however, that the arrangement of devices, seen in Figs. 5 and 6, is merely suggestive, not compulsory, as we prefer the construction shown in Patent No. 421,297, previously alluded to, because this construction enables the wrist-pin to be adjusted without stopping the machine.

We claim as our invention.

1. The combination, in a metal-shaping machine, of a frame carrying a reciprocating-ram, a lever D coupled at its upper end to said ram, and provided with a longitudinal slot $d$, a block E traversing said slot, and operated by an adjustable crank-pin F, a rock-shaft B projecting rigidly from the lower part of said lever, and serving as its center of vibration, and a shiftable clamping-band G applied to said slotted-lever, said band being open on one side and having a screw $g$ tapped in one end, all as herein described and for the purpose stated.

2. In a metal shaping machine the combination with a frame having a graduated scale on its outer face, a ram mounted to reciprocate therein, a lever D, coupled at its upper end to said ram and provided with a longitudinal slot $d$, a block E, traversing said slot and operated by an adjustable crank pin F, a rock shaft B projecting rigidly from the lower part of said lever and serving as its center of vibration, one end of said rock shaft being provided with an index which plays over the scale on the frame, and a shiftable clamping band G, applied to said slotted lever, said band being open on one side and having a screw $g$ tapped in one end, substantially as set forth.

In testimony whereof we affix our signatures in presence of two witnesses.

JAMES MILLS.
ALBERT S. SMITH.

Witnesses:
JAMES H. LAYMAN,
ALFRED M. DAVIES.